US009633797B2

(12) United States Patent
Amereller et al.

(10) Patent No.: US 9,633,797 B2
(45) Date of Patent: Apr. 25, 2017

(54) CONDUCTIVE SALT FOR LITHIUM-BASED ENERGY STORES

(71) Applicant: WESTFÄLISCHE WILHELMS-UNIVERSITÄT MÜNSTER, Münster (DE)

(72) Inventors: Marius Amereller, Münster (DE); René Schmitz, Mannheim (DE); Raphael Wilhelm Schmitz, Münster (DE); Ansgar Romek Müller, Bad Bentheim (DE); Martin Winter, Münster (DE); Christian Schreiner, Biberbach (DE); Miriam Kunze, St. Andreasberg (DE); Stefano Passerini, Münster (DE)

(73) Assignee: WESTFÄLISCHE WILHELMS-UNIVERSITÄT MÜNSTER, Münster (DE)

( * ) Notice: Subject to any disclaimer, the term of this patent is extended or adjusted under 35 U.S.C. 154(b) by 154 days.

(21) Appl. No.: 14/379,415

(22) PCT Filed: Feb. 27, 2013

(86) PCT No.: PCT/EP2013/053945
§ 371 (c)(1),
(2) Date: Aug. 18, 2014

(87) PCT Pub. No.: WO2013/127864
PCT Pub. Date: Sep. 6, 2013

(65) Prior Publication Data
US 2015/0030939 A1  Jan. 29, 2015

(30) Foreign Application Priority Data
Feb. 29, 2012 (DE) .......... 10 2012 101 669

(51) Int. Cl.
H01G 11/04 (2013.01)
H01G 11/06 (2013.01)
(Continued)

(52) U.S. Cl.
CPC ............ H01G 11/04 (2013.01); H01G 11/06 (2013.01); H01G 11/62 (2013.01);
(Continued)

(58) Field of Classification Search
CPC ........ H01G 11/60; H01G 11/62; H01G 11/64; H01M 10/052; H01M 10/0525; H01M 10/0567; H01M 10/0568; H01M 10/0569
See application file for complete search history.

(56) References Cited

U.S. PATENT DOCUMENTS 6,506,516 B1    1/2003  Wietelmann et al.
2002/0197558 A1* 12/2002 Ferreira ............... C07C 309/10
                                                430/270.1

(Continued)

FOREIGN PATENT DOCUMENTS

DE    000019829030    10/1999

OTHER PUBLICATIONS

R. Arvai et al: "New aryl-containing fluorinated sulfonic acids and their ammonium salts, useful as electrolytes for fuel cells or ionic liquids", Journal of Fluorine Chemistry, Bd. 129, Nr. 10, Oct. 1, 2008 (Oct. 1, 2008), Seiten 1029-1035, XP025468252, ISSN: 0022-1139, DOI: 10.1016/J.JFLUCHEM.2008.06.009 [gefunden am Jun. 20, 2008].

(Continued)

Primary Examiner — Nicholas P D'Aniello
(74) Attorney, Agent, or Firm — Davidson, Davidson & Kappel, LLC

(57) ABSTRACT

The invention relates to the use of lithium-2-pentafluoroethoxy-1,1,2,2-tetrafluoro-ethanesulfonate as a conductive salt
(Continued)

in lithium-based energy stores and to electrolytes containing lithium-2-pentafluoroethoxy-1,1,2,2-tetrafluoro-ethanesulfonate.

12 Claims, 7 Drawing Sheets

(51) Int. Cl.
    *H01G 11/62*     (2013.01)
    *H01M 10/052*     (2010.01)
    *H01M 10/0567*     (2010.01)
    *H01M 10/0568*     (2010.01)
    *H01M 10/0525*     (2010.01)
    *H01M 10/0569*     (2010.01)
    *H01G 11/60*     (2013.01)

(52) U.S. Cl.
    CPC ..... *H01M 10/052* (2013.01); *H01M 10/0567* (2013.01); *H01M 10/0568* (2013.01); *H01G 11/60* (2013.01); *H01M 10/0525* (2013.01); *H01M 10/0569* (2013.01); *H01M 2300/0025* (2013.01); *H01M 2300/0028* (2013.01); *H01M 2300/0031* (2013.01); *H01M 2300/0034* (2013.01); *H01M 2300/0037* (2013.01); *Y02E 60/13* (2013.01)

(56) References Cited

U.S. PATENT DOCUMENTS

| | | |
|---|---|---|
| 2006/0276670 A1 | 12/2006 | Junk et al. |
| 2007/0066822 A1 | 3/2007 | Harmer et al. |
| 2011/0195212 A1 | 8/2011 | Junk et al. |

OTHER PUBLICATIONS

An English translation of international Search Report issued in connection with International Application No. PCT/EP2013/053945 on Apr. 25, 2013.

An English Translation of International Preliminary Report on Patentability Chapter I issued in connection with International Application No. PCT/EP2013/053945 on Sep. 2, 2014.

* cited by examiner

CONDUCTIVE SALT FOR LITHIUM-BASED ENERGY STORES

This application is a U.S. national phase application under 35 U.S.C. of §371 of International Application No. PCT/EP2013/053945, filed on Feb. 27, 2013, which claims priority to DE 10 2012 101 669.0, filed on Feb. 29, 2012, the disclosures of which are all hereby incorporated by reference herein.

FIELD OF THE INVENTION

The invention relates to a conductive salt and to an electrolyte for lithium-based energy storage means.

BACKGROUND OF THE INVENTION

Lithium-ion technology is the leading technology in the field of rechargeable battery storage systems for portable electronics. Because of their high cell voltage, their superior energy density and power density and their exceedingly low self-discharge, lithium-ion batteries have high potential for these applications. Currently, lithium hexafluorophosphate ($LiPF_6$) is being used as conductive salt in commercially available lithium-ion batteries. Lithium hexafluorophosphate has a relatively high conductivity, but has considerable disadvantages because of low thermal and chemical stability and its hydrolysis sensitivity. Thus, it is known that $LiPF_6$ reacts with traces of water and other protic compounds such as alcohols, which are not entirely avoidable in lithium batteries and occur in solvents, for example, in the ppm range. This reaction is accelerated by moderately elevated temperatures. This results in a rapid loss of cell capacity, which is manifested in a shortened lifetime.

There are therefore intensive efforts to develop alternative lithium salts which can replace $LiPF_6$ as conductive salt. The lithium salts that have been developed in the last few years are frequently complex boron- or phosphorus-containing anions having nonaromatic chelating agents such as oxalate, for example lithium bis(oxalato)borate (LiBOB), which is disclosed in DE 198 29 030 C1. It is disadvantageous, however, that bis(oxalato)borate has only a low solubility in the carbonates that are typically used as solvents in electrolytes. Moreover, LiBOB-based electrolytes have a lower conductivity compared to $LiPF_6$, especially at low temperatures, and a higher viscosity.

In spite of a multitude of salts and solvents, no suitable substitute has been found as yet for $LiPF_6$ as conductive salt in carbonate mixtures. There is therefore a need for alternative lithium salts for use in lithium-ion batteries.

SUMMARY OF THE INVENTION

It was therefore an object of the present invention to provide a compound which overcomes at least one of the aforementioned disadvantages of the prior art. More particularly, it was an object of the invention to provide a lithium compound suitable as a conductive salt.

This object is achieved by an electrolyte for a lithium-based energy storage means comprising lithium 2-pentafluoroethoxy-1,1,2,2-tetrafluoroethanesulfonate.

The invention further relates to the use of lithium 2-pentafluoroethoxy-1,1,2,2-tetrafluoroethanesulfonate as conductive salt in electrolytes for lithium-based energy storage means.

Lithium 2-pentafluoroethoxy-1,1,2,2-tetrafluoroethanesulfonate is also referred to as lithium 1,1,2,2-tetrafluoro-2-(pentafluoroethoxy)ethanesulfonate.

It has been found that, surprisingly, cells in which electrolytes comprising lithium 2-pentafluoroethoxy-1,1,2,2-tetrafluoroethanesulfonate as conductive salt have been used exhibit excellent cycling stability. It is also advantageous that lithium 2-pentafluoroethoxy-1,1,2,2-tetrafluoroethanesulfonate has good lithium-ion conductivity and high electrochemical stability. Moreover, lithium 2-pentafluoroethoxy-1,1,2,2-tetrafluoroethanesulfonate is usable within a wide temperature range.

Furthermore, a great advantage of lithium 2-pentafluoroethoxy-1,1,2,2-tetrafluoroethanesulfonate is its low hydrolysis sensitivity. As compared with electrolytes that use $LiPF_6$ as conductive salt, it is thus possible to achieve a considerable improvement in operational reliability. In an especially advantageous manner, this enables use within the high-temperature range.

Moreover, lithium 2-pentafluoroethoxy-1,1,2,2-tetrafluoroethanesulfonate, in a mixture of ethylene carbonate, gamma-butyrolactone and fluoroethylene carbonate, exhibits an anodic stability of 5.97 V, which allows use with high-voltage cathode materials. More particularly, corrosion measurements show that lithium 2-pentafluoroethoxy-1,1,2,2-tetrafluoroethanesulfonate does not exhibit any corrosion of the aluminum used as current collector on the cathode side, but instead, like $LiPF_6$, forms a protective layer on aluminum. Lithium 2-pentafluoroethoxy-1,1,2,2-tetrafluoroethanesulfonate is therefore advantageously suitable as a conductive salt for commercial lithium-ion batteries.

The electrolyte in lithium-based electrochemical energy storage means takes care of the charge transport. The conductive salt of a liquid electrolyte is therefore preferably present dissolved in a solvent. The electrolyte comprises lithium 2-pentafluoroethoxy-1,1,2,2-tetrafluoroethanesulfonate preferably dissolved in an organic solvent. The electrolyte is producible, for example, by introducing and dissolving lithium 2-pentafluoroethoxy-1,1,2,2-tetrafluoroethanesulfonate in a solvent or a solvent mixture.

In preferred embodiments, the concentration of lithium 2-pentafluoroethoxy-1,1,2,2-tetrafluoroethanesulfonate in the electrolyte is in the range from ≥0.1 M to ≤2 M, preferably in the range from ≥0.5 M to ≤1.5 M, more preferably in the range from ≥0.7 M to ≤1.2 M.

In a particularly preferred embodiment, the concentration of lithium 2-pentafluoroethoxy-1,1,2,2-tetrafluoroethanesulfonate in the electrolyte is 1 M. Advantageously, such concentrations of lithium 2-pentafluoroethoxy-1,1,2,2-tetrafluoroethanesulfonate lead to a good conductivity.

In preferred embodiments, the electrolyte comprises an organic solvent, an ionic liquid and/or a polymer matrix.

Preferably, an electrolyte comprises lithium 2-pentafluoroethoxy-1,1,2,2-tetrafluoroethanesulfonate and an organic solvent. It has been found that lithium 2-pentafluoroethoxy-1,1,2,2-tetrafluoroethanesulfonate has a good solubility in organic solvents, especially in cyclic or linear carbonates. This advantageously enables the use of lithium 2-pentafluoroethoxy-1,1,2,2-tetrafluoroethanesulfonate in the liquid electrolytes used in commercial lithium-ion batteries.

In preferred embodiments, the organic solvent is selected from the group comprising ethylene carbonate, propylene carbonate, diethyl carbonate, dimethyl carbonate, ethyl methyl carbonate, acetonitrile, glutaronitrile, adiponitrile, pimelonitrile, gamma-butyrolactone, gamma-valerolactone, dimethoxyethane, 1,3-dioxolane, methyl acetate and/or a mixture thereof. Suitable organic solvents are especially selected from the group comprising cyclic carbonates such as ethylene carbonate and propylene carbonate and/or linear carbonates such as diethyl carbonate, dimethyl carbonate and ethyl methyl carbonate. The organic solvent is preferably selected from the group comprising ethylene carbonate, diethyl carbonate, dimethyl carbonate, ethyl methyl carbonate and/or mixtures thereof.

A preferred solvent is ethylene carbonate. According to the IUPAC nomenclature, ethylene carbonate is also referred to as 1,3-dioxolan-2-one. Ethylene carbonate is commercially available. Ethylene carbonate has a high boiling point and a high flashpoint. It is also advantageous that ethylene carbonate enables a high conductivity through a good salt dissociation.

In a preferred embodiment, the organic solvent comprises a mixture of ethylene carbonate and at least one further organic solvent, preferably gamma-butyrolactone. Preference is also given to binary mixtures of carbonates, especially of ethylene carbonate with a further carbonate, for example diethyl carbonate, dimethyl carbonate and/or ethyl methyl carbonate, especially diethyl carbonate.

Preferably, the ratio of ethylene carbonate and the at least one further organic solvent, preferably gamma-butyrolactone, is in the range from ≥1:99 to ≤99:1, preferably in the range from ≥1:9 to ≤9:1, preferably in the range from ≥3:7 to ≤1:1. Unless stated otherwise, the ratio reported is based on the proportions by weight of the solvents. In a solvent mixture of ethylene carbonate and diethyl carbonate in a ratio of 1:1, it was advantageously possible to achieve a high conductivity within a temperature range from −25° C. to +60° C.

Preference is also given to ternary mixtures comprising at least one carbonate as solvent. Especially preferred mixtures are those of ethylene carbonate with a further solvent, for example gamma-butyrolactone, and a compound suitable for forming a solid electrolyte interphase (SEI). The electrolyte may therefore further comprise additives, especially film-forming electrolyte additives.

In preferred embodiments, the electrolyte comprises a compound selected from the group comprising chloroethylene carbonate, fluoroethylene carbonate, vinylethylene carbonate, ethylene sulfite, ethylene sulfate, propanesulfonates, sulfites, preferably dimethyl sulfite and propylene sulfite, sulfates, optionally F-, Cl- or Br-substituted butyrolactones, phenylethylene carbonate, vinyl acetate and/or trifluoropropylene carbonate.

Among the carbonate-based compounds, preference is given to chlorine- or fluorine-substituted carbonates, especially fluoroethylene carbonate (FEC). The compounds can improve the battery performance, for example the capacity or cycling lifetime. Fluoroethylene carbonate in particular can lead to an improved long-term stability of a cell.

Preferably, the electrolyte comprises an additive, especially a compound selected from the group comprising chloroethylene carbonate, fluoroethylene carbonate, vinylethylene carbonate, ethylene sulfite, ethylene sulfate, propanesulfonates, sulfites, preferably dimethyl sulfite and propylene sulfite, sulfates, optionally F-, Cl- or Br-substituted butyrolactones, phenylethylene carbonate, vinyl acetate and/or trifluoropropylene carbonate, preferably fluoroethylene carbonate, in the range from ≥0.1% by weight to ≤10% by weight, preferably in the range from ≥1% by weight to ≤5% by weight, more preferably in the range from ≥2% by weight to ≤3% by weight, based on the total weight of the electrolyte.

Preferably, the organic solvent comprises a mixture of ethylene carbonate and at least one further organic solvent, preferably selected from the group comprising gamma-valerolactone or gamma-butyrolactone and fluoroethylene carbonate.

Preferably, the ratio of ethylene carbonate and the at least one further organic solvent, preferably gamma-valerolactone or gamma-butyrolactone, and an additive, preferably fluoroethylene carbonate, is in the range from ≥98:1:1 to ≤1:1:98, preferably in the range from ≥80:15:5 to ≤15:80:5, more preferably in the range from ≥4.5:4.5:1 to ≤9.5:9.5:1. Unless stated otherwise, the ratio reported is based on the proportions by weight.

More preferably, the organic solvent comprises a mixture of ethylene carbonate, gamma-butyrolactone and fluoroethylene carbonate, especially in a ratio of 4.5:4.5:1. In a solvent mixture comprising ethylene carbonate, gamma-butyrolactone and fluoroethylene carbonate in a ratio of 4.5:4.5:1, improved operating characteristics have advantageously been found in stress tests, and improved performance of the cell in the first cycles. Thus, fluoroethylene carbonate can form a protective layer on a graphite anode and lower electrode overpotentials.

Further promising solvents have been found to be ionic liquids which combine a high thermal and electrochemical stability with a high ionic conductivity. This is especially advantageous for use together with lithium 2-methoxy-1,1,2,2-tetrafluoro-ethanesulfonate. Preferred ionic liquids include a cation selected from the group comprising 1-ethyl-3-methylimidazolium (EMI$^+$), 1,2-dimethyl-3-propyl-imidazolium (DMPI$^+$), 1,2-diethyl-3,5-dimethylimidazolium (DEDMI$^+$), trimethyl-n-hexylammonium (TMHA$^+$), N-alkyl-N-methylpyrrolidinium (PYR$_{1R}^+$), N-alkyl-N-methylpiperidinium (PIP$_{1R}^+$) and/or N-alkyl-N-methylmorpholinium (MORP$_{1R}^+$), and an anion selected from the group comprising bis(trifluoromethanesulfonyl)imide (TFSI$^-$), bis(pentafluoroethanesulfonyl)imide (BETI$^-$), bis(fluorosulfonyl)imide (FSI$^-$), 2,2,2-trifluoro-N-(trifluoromethanesulfonyl)acetamide (TSAC$^-$), tetrafluoroborate (BF$_4^-$), pentafluoroethanetrifluoroborate (C$_2$F$_5$BF$_3^-$), hexafluorophosphate (PF$_6^-$) and/or tri(pentafluoroethane)trifluorophosphate ((C$_2$F$_5$)$_3$PF$_3^-$). Preferred N-alkyl-N-methylpyrrolidinium (PYR$_{1R}^+$) cations are selected from the group comprising N-butyl-N-methylpyrrolidinium (PYR$_{14}^+$) and/or N-methyl-N-propylpyrrolidinium (PYR$_{13}^+$). Preferred ionic liquids are selected from the group comprising N-butyl-N-methylpyrrolidinium bis(trifluoromethanesulfonyl)imide (PYR$_{14}$TFSI) and/or N-methyl-N-propylpyrrolidinium bis (trifluoromethanesulfonyl)imide (PYR$_{13}$TFSI).

Further suitable electrolyte materials are polymer electrolytes, where in the polymer electrolyte may take the form of a gel polymer electrolyte or solid polymer electrolyte. Solid polyelectrolytes exhibit good properties with regard to the demands on future generations of accumulator. They enable a solvent-free structure which is easy to produce and may take various forms. Furthermore, the energy density can be enhanced, since the three-layer structure of electrolyte-separator-electrolyte can be dispensed with, so that only a thin polymer film is required between the electrodes. Solid electrolytes are generally chemically and electrochemically stable with respect to electrode materials and, moreover, do not escape from the cell. Gel polymer electrolytes usually comprise an aprotic solvent and a polymer matrix.

Preferred polymers for solid polymer electrolytes and gel polymer electrolytes are selected from the group comprising homo- or copolymers of polyethylene oxide (PEO), polypropylene oxide (PPO), polyvinylidene fluoride (PVdF), polyvinylidene fluoride-hexafluoro-propylene (PVdF-HFP), polyacrylonitrile (PAN), polymethylmethacrylate (PMMA), polymethylmethacrylate (PEMA), polyvinyl acetate (PVAc), polyvinyl chloride (PVC), polyphosphazenes, polysiloxanes, polyvinyl alcohol (PVA) and/or homocopolymers and (block) copolymers comprising functional side chains selected from the group comprising ethylene oxide, propylene oxide, acrylonitrile and/or siloxanes.

The invention further relates to a lithium-based energy storage means, preferably a lithium battery, lithium-ion battery, lithium-ion accumulator, lithium polymer battery or lithium-ion capacitor, comprising lithium 2-pentafluoroethoxy-1,1,2,2-tetrafluoroethanesulfonate. The invention further relates to a lithium-based energy storage means, preferably a lithium battery, lithium-ion battery, lithium-ion accumulator, lithium polymer battery or lithium-ion capacitor, comprising an electrolyte comprising lithium 2-methoxy-1,1,2,2-tetrafluoroethanesulfonate according to the invention.

The lithium-based energy storage means are suitable for all fields of use, especially including larger systems such as automobiles or as stationary energy storage means for renewable energies.

Lithium 2-pentafluoroethoxy-1,1,2,2-tetrafluoroethanesulfonate is commercially available or preparable by customary synthesis methods.

Lithium 2-pentafluoroethoxy-1,1,2,2-tetrafluoroethanesulfonate is usable as a conductive salt in electrolytes for lithium-based energy storage means. The present invention further relates to the use of lithium 2-pentafluoroethoxy-1,1,2,2-tetrafluoroethanesulfonate in lithium-based energy storage means. In an advantageous manner, through use of lithium 2-pentafluoroethoxy-1,1,2,2-tetrafluoroethanesulfonate, it is possible to provide a hydrolysis-stable conductive salt. In this way, a cell is usable within an extended temperature range.

Preferably, lithium 2-pentafluoroethoxy-1,1,2,2-tetrafluoroethanesulfonate is usable in electrolytes in a concentration in the range from $\geq 0.1$ M to $\leq 2$ M, preferably in the range from $\geq 0.5$ M to $\leq 1.5$ M, more preferably in the range from $\geq 0.7$ M to $\leq 1.2$ M. In a particularly preferred embodiment, lithium 2-pentafluoroethoxy-1,1,2,2-tetrafluoroethanesulfonate is used in a concentration of 1 M.

Primary and secondary lithium-based energy storage means are preferably selected from the group comprising lithium batteries, lithium-ion batteries, lithium-ion accumulators, lithium polymer batteries and/or lithium-ion capacitors. More particularly, lithium 2-pentafluoroethoxy-1,1,2,2-tetrafluoroethanesulfonate is usable as a conductive salt for a lithium-ion battery or a lithium-ion accumulator.

BRIEF DESCRIPTION OF THE DRAWINGS

Examples and figures which serve to illustrate the present invention are produced hereinafter.

The figures here show.

DETAILED DESCRIPTION OF THE INVENTION

Example 1

Preparation of lithium 2-pentafluoroethoxy-1,1,2,2-tetrafluoroethanesulfonate 15 g of perfluoro(2-ethoxyethane)sulfonic acid (ABCR, 95%) were mixed with 2.01 g of lithium hydroxide (Sigma-Aldrich, reagent grade, $\geq 98\%$) in 50 ml of Milli-Q water (Millipore), and the mixture was stirred at 50° C. for 2 hours. After removing the water and recrystallizing from acetonitrile, lithium 2-pentafluoroethoxy-1,1,2,2-tetrafluoroethanesulfonate was obtained as colorless crystals. Through redissolution and removal of the solvent, the salt was present in the form of a white powder, which was dried at 80° C. for 24 hours before use.

Example 2

Determination of the conductivity of lithium 2-pentafluoroethoxy-1,1,2,2-tetrafluoroethanesulfonate The conductivity of a 1 M solution of the lithium 2-pentafluoroethoxy-1,1,2,2-tetrafluoroethanesulfonate prepared according to Example 1 was determined in a solvent mixture of ethylene carbonate (45% by weight), gamma-butyrolactone (45% by weight) and fluoroethylene carbonate (10% by weight) within a temperature range from −25° C. to +60° C.

A mixture of 45% by weight of ethylene carbonate (EC) (Ferro Corporation, battery grade), 45% by weight gamma-butyrolactone ($\gamma BL$) (Ferro Corporation, battery grade) and 10% by weight of fluoroethylene carbonate (Solvay GmbH)

was prepared. In this solvent mixture, 322.1 mg of the lithium 2-pentafluoroethoxy-1,1,2,2-tetrafluoroethanesulfonate prepared according to Example 1 were dissolved per milliliter, so as to give a concentration of 1 M of the lithium salt.

The conductivity of the electrolyte was analyzed using platinum conductivity measurement cells (Amel Glassware, cell constant 1 cm$^{-1}$) with a potentiostat (Solartron 1287A) in conjunction with an impedance measurement unit (Solartron 1260) within a temperature range from −25° C. to +60° C. (climate-controlled cabinet, Binder MK53). For this purpose, the conductivity measurement cells were first heated to 60° C. and then cooled in temperature intervals of 5° C. to −25° C.

Figure 1:
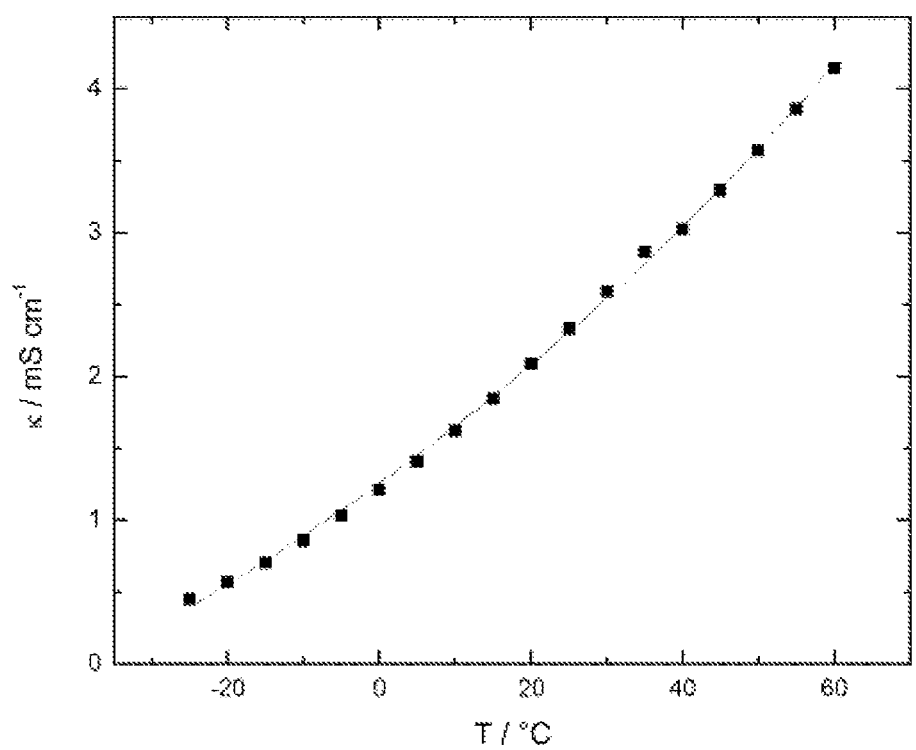
FIG. 1 shows conductivity ($\kappa$) of a 1 M solution of lithium 2-pentafluoroethoxy-1,1,2,2-tetrafluoroethanesulfonate in a solvent mixture of ethylene carbonate (45%), gamma-butyrolactone (45%) and fluoroethylene carbonate (10%) as a function of temperature.

FIG. 1 shows the plot of conductivity κ within the temperature range from −25° C. to +60° C. in the solvent mixture of ethylene carbonate, gamma-butyrolactone and fluoroethylene carbonate EC:γBL:FEC (4.5:4.5:1). The conductivity of 1 M lithium 2-pentafluoroethoxy-1,1,2,2-tetrafluoroethanesulfonate in this mixture was about 2.4 mS cm$^{-1}$ at 25° C. This shows that lithium 2-pentafluoroethoxy-1,1,2,2-tetrafluoroethanesulfonate in the customary carbonate solvents has a sufficient conductivity at 25° C.

Example 3

Determination of the Electrochemical Stability of Lithium 2-pentafluoroethoxy-1,1,2,2-tetrafluoroethanesulfonate The electrochemical stability of a 1 M solution of the lithium 2-pentafluoroethoxy-1,1,2,2-tetrafluoroethanesulfonate prepared in Example 1 in a solvent mixture of ethylene carbonate (45% by weight), gamma-butyrolactone (45% by weight) and fluoroethylene carbonate (10% by weight) (EC:γBL:FEC, 4.5:4.5:1) was determined by means of linear sweep voltammetry (LSV). In this method, there is a continuous change in the electrode voltage (linear sweep).

The cathodic stability limit, the potential at which reduction sets in, was defined as that potential at which the current density falls below −0.1 mA cm$^{-2}$. The anodic stability limit, the potential at which oxidation sets in, was defined as that potential at which the current density goes above +0.1 mA cm$^{-2}$. The anodic stability in particular depends crucially on the stability of the electrolyte used.

The experiments were conducted in a 3-electrode arrangement in modified Swagelok® T-pieces (tube connector, stainless steel body) with a platinum electrode (eDAQ, model: ET075, diameter 1 mm) as working electrode and lithium foil (diameter 12 mm or 7 mm, Chemetall) as counterelectrode and reference electrode. In addition, the cell body was lined with a polyester film siliconized on one side (Mylar®, PPI-SP 914, 100 μm) and the electrodes were introduced into the cell body. The electrodes were separated by a nonwoven fabric (Freudenberg®, FS2226E, 6 plies) which had been impregnated with the corresponding electrolyte. The scan rate was 1 mV s$^{-2}$.

Figure 2:
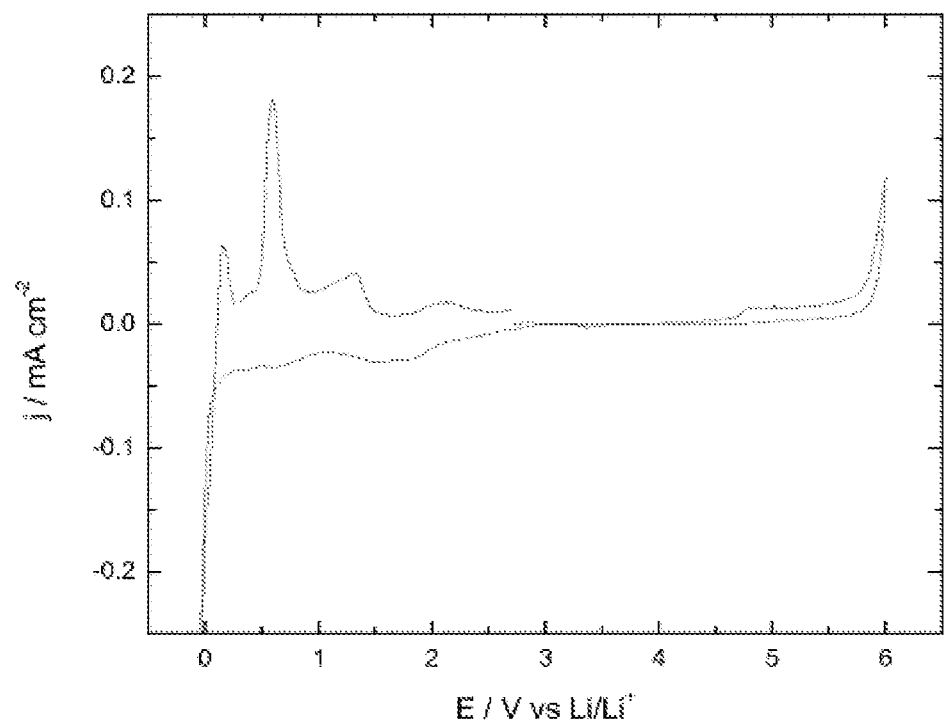
FIG. 2 shows the electrochemical stability window of a 1 M solution of lithium 2-pentafluoroethoxy-1,1,2,2-tetrafluoroethanesulfonate in a solvent mixture of ethylene carbonate (45%), gamma-butyrolactone (45%) and fluoroethylene carbonate (10%).

As shown in FIG. 2, in the case of the 1 M lithium 2-pentafluoroethoxy-1,1,2,2-tetrafluoroethanesulfonate electrolyte in EC:γBL:FEC, 4.5:4.5:1, the cathodic stability limit was attained at 0.015 V. The anodic stability of lithium 2-pentafluoroethoxy-1,1,2,2-tetrafluoroethanesulfonate was 5.97 V. This anodic stability allows use of the electrolyte in combination with high-voltage cathode materials.

This result shows that lithium 2-pentafluoroethoxy-1,1,2,2-tetrafluoroethanesulfonate has a sufficiently good electrochemical stability for all electrochemical applications in the customary carbonate solvents.

Example 4

Cyclic Voltammetry

The cyclic voltammetry of a 1 M solution of the lithium 2-pentafluoroethoxy-1,1,2,2-tetrafluoroethanesulfonate prepared in Example 1 was conducted in a solvent mixture of 45% by weight of ethylene carbonate, 45% by weight of gamma-butyrolactone and 10% by weight of fluoroethylene carbonate (EC:γBL:FEC, 4.5:4.5:1)

The experiments were conducted in a 3-electrode arrangement in modified Swagelok® T-pieces (tube connector, stainless steel body) with a graphite electrode (Timcal T44 graphite material) as working electrode and lithium foil (diameter 12 mm and 4 mm, respectively, Chemetall) as counterelectrode and reference electrode. In addition, the cell body was lined with a polyester film siliconized on one side (Mylar®, PPI-SP 914, 100 μm) and the electrodes were introduced into the cell body. The electrodes were separated by a nonwoven fabric (Freudenberg®, FS2226E, 6 plies) which had been impregnated with the corresponding electrolyte.

Figure 3:
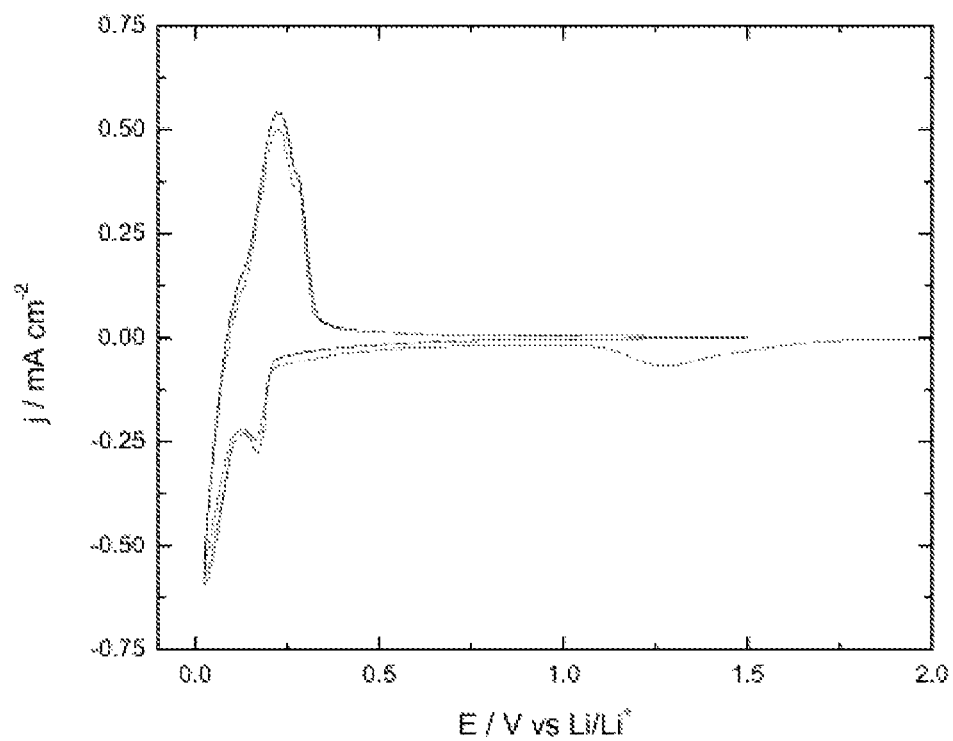
FIG. 3 shows the cyclic voltammetry of a 1 M solution of lithium 2-pentafluoroethoxy-1,1,2,2-tetrafluoroethanesulfonate in a solvent mixture of ethylene carbonate (45%), gamma-butyrolactone (45%) and fluoroethylene carbonate (10%).

FIG. 3 shows the results of the cyclic voltammetry. In FIG. 3, the intercalation and deintercalation phases identifiable by the increased current density are recognizable in the range between 0 and 0.3 V. This demonstrates the reversibility of the system. In addition, the breakdown of the fluoroethylene carbonate (FEC) in the first cycle can be inferred from the graph.

Example 5

Determination of the Cycling Performance of Lithium 2-pentafluoroethoxy-1,1,2,2-tetrafluoroethanesulfonate with a Graphite Electrode The cycling performance of a 1 M solution of the lithium 2-pentafluoroethoxy-1,1,2,2-tetrafluoroethanesulfonate prepared according to Example 1 was determined in a mixture of 45% by weight each of ethylene carbonate and gamma-butyrolactone (γBL) and 10% by weight of fluoroethylene carbonate (FEC).

The experiments were conducted in a 3-electrode arrangement in modified Swagelok® T-pieces (tube connector, stainless steel body) with a graphite electrode (Timcal T44 graphite material) as working electrode and lithium foil (diameter 12 mm and 5 mm, respectively, Chemetall) as counterelectrode and reference electrode. In addition, the cell body was lined with a polyester film siliconized on one side (Mylar®, PPI-SP 914, 100 μm) and the electrodes were introduced into the cell body. The electrodes were separated by a nonwoven fabric (Freudenberg®, FS2226E, 6 plies) which had been impregnated with the corresponding electrolyte.

The test of the cycling performance runs through several phases. In the first phase, the forming of the graphite (SEI formation) was ensured by three cycles with a constant current C rate of C/5. Thereafter, in the second phase, the cycling performance was tested over 20 cycles at a charge and discharge rate of 1 C. The cell system was kept here at a voltage of 0.025 V for one hour after charging. In the third phase, the graphite was always charged at C/2 and, thereafter, kept at 0.025 V for one hour before the graphite was discharged at different rates. The D rates (discharge rates)

used were D/5, D/3, D/2, 1D, 2D, 3D, 5D and 10D. The D rate test was followed by five cycles with charge and discharge rates of C/5, in order to check whether the graphite had been damaged by the stress test. The last phase involved the same cycling parameters as phase 2, but was conducted for 30 cycles.

Figure 4:
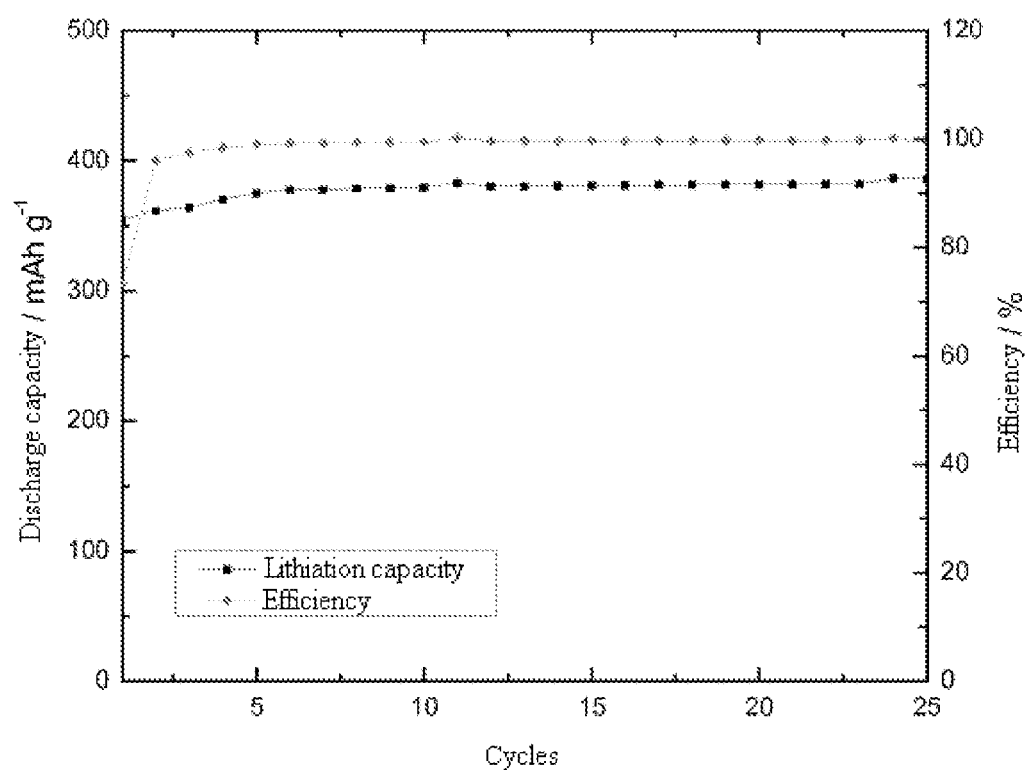
FIG. 4 shows the discharge capacity and efficiency of a lithium-ion half-cell with 1 M lithium 2-pentafluoroethoxy-1,1,2,2-tetrafluoroethanesulfonate in a solvent mixture of ethylene carbonate (45%), gamma-butyrolactone (45%) and fluoroethylene carbonate (10%). The working electrode used was the anode material graphitic carbon.

FIG. 4 shows the discharge capacity and efficiency against the number of cycles of the lithium-ion battery half-cell charged at a C rate of 1 C. As shown in FIG. 4, the half-cell with 1 M lithium 2-pentafluoroethoxy-1,1,2,2-tetrafluoroethanesulfonate had a starting capacity of about 370 mAh $g^{-1}$ after the forming of the cell, which rose with the number of cycles to about 380 mAh $g^{-1}$ in the 11th cycle.

In addition, the efficiency of the cell rose after three cycles to more than 99% of a maximum efficiency of 100%. More particularly, the cell exhibited excellent cycling stability.

Example 6

Determination of the Cycling Performance of Lithium 2-pentafluoroethoxy-1,1,2,2-tetrafluoroethanesulfonate with NCM Cathode The cycling performance on NCM cathodes in a half-cell was conducted as described in Example 5 in a 3-electrode arrangement, using a nickel cobalt manganese oxide electrode (NCM electrode, Toda Kogyo Europe GmbH) as working electrode and lithium foil (diameter 12 mm and 5 mm, respectively, Chemetall) as counterelectrode and reference electrode. In this example, a 1 M solution of the lithium 2-pentafluoroethoxy-1,1,2,2-tetrafluoroethane-sulfonate prepared according to Example 1 in a mixture of 45% by weight each of ethylene carbonate and gamma-butyrolactone (γBL) and 10% by weight of fluoroethylene carbonate (FEC) was used.

For comparison, the cycling performance of a 1 M solution of LiPF$_6$ (Sigma Aldrich, battery grade) was likewise conducted in a mixture of 45% by weight each of ethylene carbonate and gamma-butyrolactone (γBL) and 10% by weight of fluoroethylene carbonate (FEC) as described in Example 5 in a 3-electrode arrangement with a nickel cobalt manganese oxide electrode (NCM electrode, Toda Kogyo Europe GmbH) as working electrode and lithium foil (diameter 12 mm or 5 mm, respectively, Chemetall) as counterelectrode and reference electrode.

Figure 5:
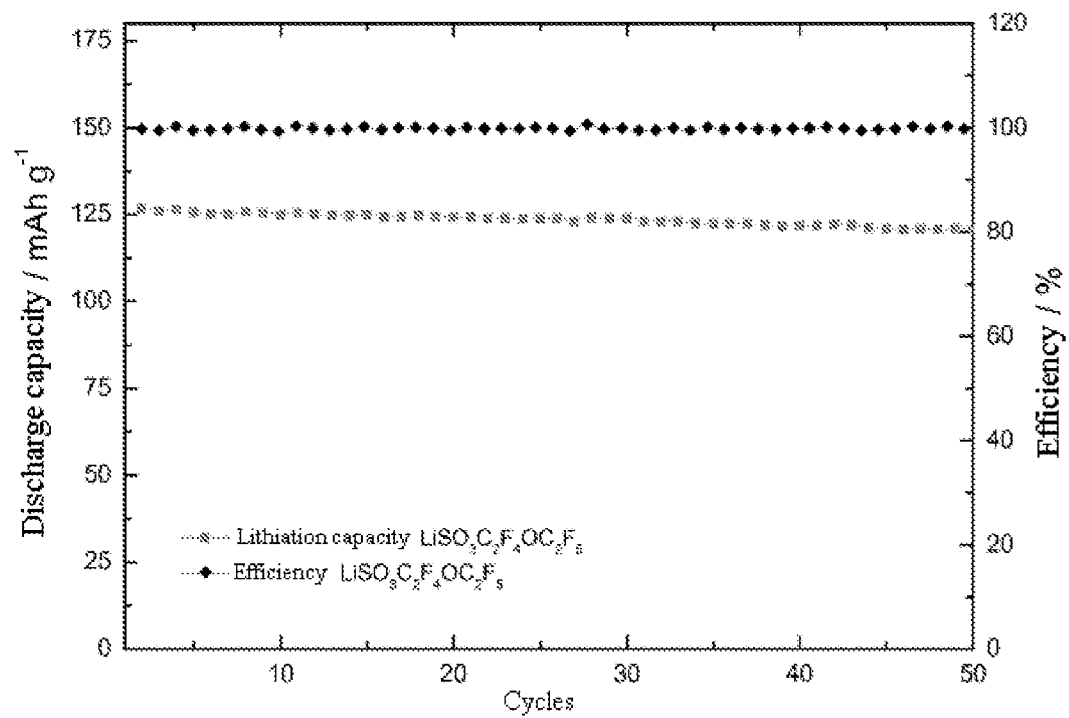
FIG. 5 shows the discharge capacity and efficiency of a lithium-ion half-cell with 1 M lithium 2-pentafluoroethoxy-1,1,2,2-tetrafluoroethanesulfonate ($LiSO_3C_2F_4OC_2F_5$) in a solvent mixture of ethylene carbonate, gamma-butyrolactone and fluoroethylene carbonate in a ratio of 4.5:4.5:1. The working electrode used was the cathode material nickel manganese cobalt oxide.

FIG. 5 shows the discharge capacity and efficiency of the lithium-ion half-cell with 1 M lithium 2-pentafluoroethoxy-1,1,2,2-tetrafluoroethanesulfonate (LiSO$_3$C$_2$F$_4$OC$_2$F$_5$).

As FIG. 5 shows, the half-cell with 1 M lithium 2-pentafluoroethoxy-1,1,2,2-tetrafluoroethanesulfonate had a starting capacity of about 126 mAh $g^{-1}$ after the forming of the cell, which fell with the number of cycles to about 118 mAh $g^{-1}$ in the 70th cycle. In addition, the efficiency of the cell after three cycles rose to more than 99% of a maximum efficiency of 100%. It was found that the cell exhibited excellent cycling stability even with the NCM cathode.

Example 7

Determination of the Corrosion Characteristics of Lithium 2-pentafluoroethoxy-1,1,2,2-tetrafluoroethane-sulfonate The corrosion characteristics of the lithium 2-pentafluoroethoxy-1,1,2,2-tetrafluoroethanesulfonate prepared in Example 1 in relation to aluminum were determined in comparison with lithium bis(trifluoro-methanesulfonyl)imide (LiN(SO$_2$CF$_3$)$_2$, LiTFSI), which is known to be corrosive.

In each case, a 1 M solution of the lithium 2-pentafluoroethoxy-1,1,2,2-tetrafluoroethanesulfonate prepared in Example 1 and LiTFSI in a solvent mixture of ethylene carbonate (45% by weight), gamma-butyrolactone (45% by weight) and fluoroethylene carbonate (10% by weight) (EC:γBL:FEC, 4.5:4.5:1) was used.

To measure the aluminum corrosion properties of the electrolytes, 3-electrode cells (modified Swagelok® T-pieces, stainless steel body) with aluminum foil (diameter 12 mm or 7 mm) as working electrode and lithium foil (diameter 12 mm and 5 mm, respectively, Chemetall) as counterelectrode and reference electrode were produced. In addition, the cell body was lined with a polyester film siliconized on one side (Mylar®, PPI-SP 914, 100 μm) and the electrodes were introduced into the cell body. The electrodes were separated by a nonwoven fabric (Freudenberg®, FS2226E, 6 plies) which had been impregnated with the corresponding electrolyte.

Figure 6:
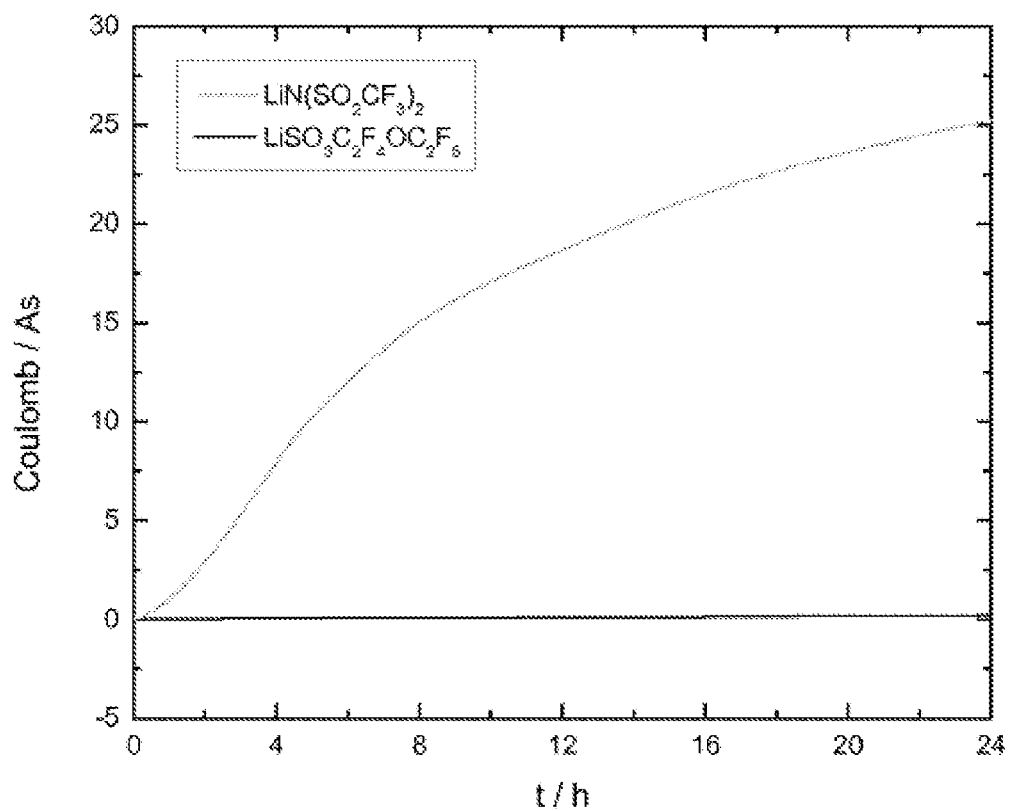
FIG. 6 shows the breakdown current for corrosion measurements against aluminum conducted with 1 M lithium 2-pentafluoroethoxy-1,1,2,2-tetrafluoroethanesulfonate ($LiSO_3C_2F_4OC_2F_5$) in a solvent mixture of ethylene carbonate (45%), gamma-butyrolactone (45%) and fluoroethylene carbonate (10%), and with the known corrosive conductive salt lithium bis(trifluoromethanesulfon)imide ($LiN(SO_2CF_3)_2$, LiTFSI).

Starting at the open-circuit voltage of the cell, the potential was increased in 100 mV steps at 1 mV $s^{-1}$ and then the particular potential was maintained for one hour, until the final voltage of 5 V was ultimately attained. The voltage was then kept constant for 24 hours. FIG. 6 shows the breakdown current for corrosion measurements against aluminum for 1 M lithium 2-pentafluoroethoxy-1,1,2,2-tetrafluoroethanesulfonate (LiSO$_3$C$_2$F$_4$OC$_2$F$_5$) and for lithium bis(trifluoromethanesulfonyl)imide (LiN(SO$_2$CF$_3$)$_2$, LiTFSI), which is known to be corrosive.

As shown in FIG. 6, the breakdown current on the aluminum foil rose when LiTFSI was used as conductive salt. This effect is attributable to aluminum corrosion. In contrast, the measured current when 1 M lithium 2-methoxy-1,1,2,2-tetrafluoroethanesulfonate was used in the electrolyte remained constantly low.

This result shows that, when 1 M lithium 2-methoxy-1,1,2,2-tetrafluoroethanesulfonate is used in the electrolyte, aluminum corrosion can be avoided.

Example 8

Thermal Stability

For the examination of thermal aging, a 1 M solution of the lithium 2-pentafluoroethoxy-1,1,2,2-tetrafluoroethanesulfonate prepared in Example 1 in a solvent mixture of 45% by weight of ethylene carbonate, 45% by weight of gamma-butyrolactone and 10% by weight of fluoroethylene carbonate (EC:γBL:FEC, 4.5:4.5:1) was prepared. 400 μl of this mixture were transferred to an NMR tube and subsequently stored at 60° C. in a climate-controlled chamber for two weeks. Thereafter, the sample was analyzed with the aid of a Bruker Avance III 400 MHz spectrometer, and the result was compared with the analysis of an unaged sample of the mixture.

It was found that the thermal stability of 1 M lithium 2-methoxy-1,1,2,2-tetrafluoroethanesulfonate exceeded the stability of the LiPF$_6$ electrolyte, since the composition of the electrolyte had not changed within the 2 weeks, and no new compounds were detectable within the mixture.

Example 9

Determination of Cycling Performance of lithium 2-pentafluoroethoxy-1,1,2,2-tetrafluoroethanesulfonate with Silicon-Graphite Composite Electrodes The cycling performance of a 1 M solution of the lithium 2-pentafluoroethoxy-1,1,2,2-tetrafluoroethanesulfonate prepared according to Example 1 was also determined using a silicon-graphite composite electrode in a mixture of 45% by weight each of ethylene carbonate and gamma-butyrolactone (γ-BL) and 10% by weight of fluoroethylene carbonate (FEC).

The experiments were conducted in a 3-electrode arrangement in modified Swagelok® T-pieces (tube connector, stainless steel body) with a silicon-graphite composite electrode (Evonik silicon material 20%, Timcal SFG6 graphite material 60%) as working electrode and lithium foil (diameter 12 mm or 5 mm, Chemetall) as counterelectrode and reference electrode. In addition, the cell body was lined with a polyester film siliconized on one side (Mylar®, PPI-SP 914, 100 μm) and the electrodes were introduced into the cell body. The electrodes were separated by a nonwoven fabric (Whatman®) which had been impregnated with the corresponding electrolyte.

For comparison, the cycling performance of a 1 M solution of $LiPF_6$ (Sigma Aldrich, battery grade) was conducted in the same mixture of 45% by weight each of ethylene carbonate and gamma-butyrolactone (γ-BL) and 10% by weight of fluoroethylene carbonate (FEC), likewise as just described in a 3-electrode arrangement with a silicon-graphite composite electrode (Evonik silicon material 20%, Timcal SFG6 graphite material 60%) as working electrode and lithium foil (diameter 12 mm or 5 mm, Chemetall) as counterelectrode and reference electrode.

The test of cycling performance included, in the first cycle, forming of the silicon-graphite composite material (SEI formation) with a constant current C rate of C/5. Thereafter, the cycling performance was observed at a charge and discharge rate of 1 C over a period of 250 cycles.

Figure 7:
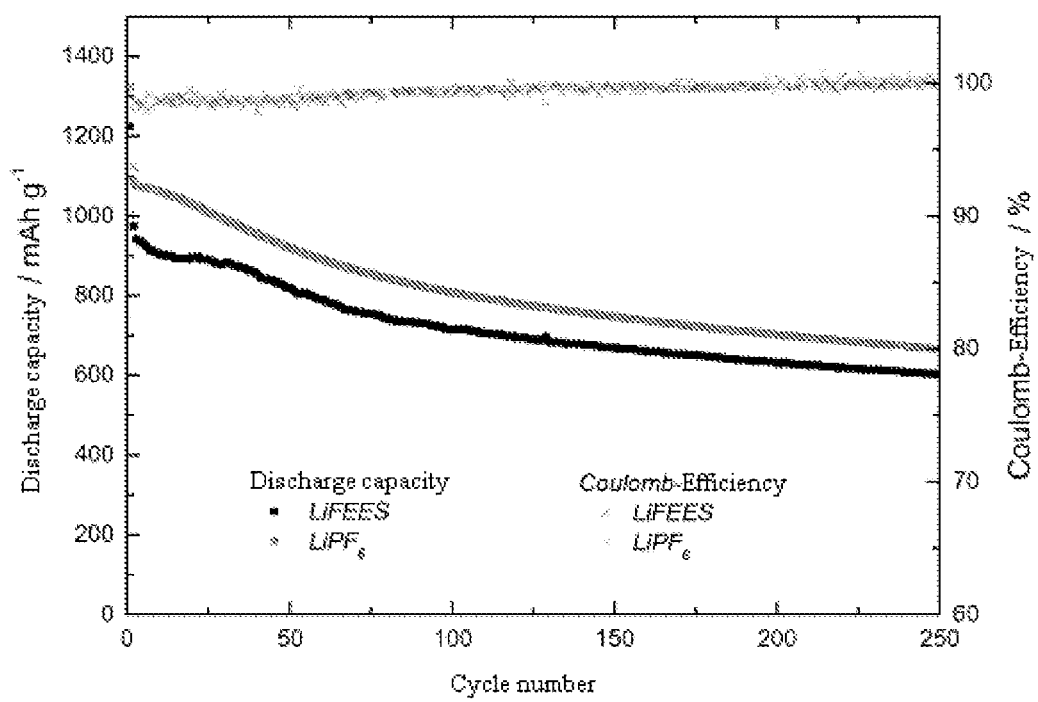
FIG. 7 shows the discharge capacity and efficiency of two lithium-ion half-cells, using 1 M lithium 2-pentafluoroethoxy-1,1,2,2-tetrafluoroethanesulfonate (LiFEES) and 1 M lithium hexafluorophosphate ($LiPF_6$), each in a solvent mixture of ethylene carbonate (45%), gamma-butyrolactone (45%) and fluoroethylene carbonate (10%). The working electrode used in each case was a silicon-graphite composite anode material.

FIG. 7 shows the discharge capacity and efficiency of the lithium-ion half-cells using 1 M lithium 2-pentafluoroethoxy-1,1,2,2-tetrafluoroethanesulfonate (LiFEES) and 1 M $LiPF_6$. As FIG. 7 shows, the half-cell with 1 M LiFEES in EC:γ-BL (1:1, 10% FEC) had a starting capacity of about 940 mAh $g^{-1}$ after the forming of the cell, which fell to about 895 mAh $g^{-1}$ over the subsequent 10 cycles and stabilized briefly at this value. The 80% of the initial capacity was attained after 75 cycles. The efficiency of the cell was 90% in the first cycle, rose to more than 98% after three cycles and reached a maximum efficiency of nearly 100% after 15 cycles. The comparative cell with 1 M $LiPF_6$ had a starting capacity of about 1080 mAh $g^{-1}$ after the forming of the cell, which fell to 80% of the initial capacity over 70 cycles.

This shows that the use of 1 M lithium 2-pentafluoroethoxy-1,1,2,2-tetrafluoroethanesulfonate in a cell with silicon-graphite anode material too exhibited excellent cycling stability corresponding to $LiPF_6$ and a capacity comparable with $LiPF_6$.

These results show overall that lithium 2-pentafluoroethoxy-1,1,2,2-tetrafluoroethanesulfonate is one possible substitute for $LiPF_6$ as conductive salt in lithium-ion batteries.

The invention claimed is:

1. A liquid electrolyte for a lithium-based energy storage means consisting essentially of
   a conductive salt
   a solvent
wherein the conductive salt is dissolved in the solvent and wherein the conductive salt is lithium 2-pentafluoroethoxy-1,1,2,2-tetrafluoro-ethane-sulfonate.

2. The electrolyte as claimed in claim 1, wherein the concentration of lithium 2-pentafluoroethoxy-1,1,2,2-tetrafluoroethanesulfonate in the electrolyte is from ≥0.1 M to ≤2 M.

3. The electrolyte as claimed in claim 1, wherein the concentration of lithium 2-pentafluoroethoxy-1,1,2,2-tetrafluoroethanesulfonate in the electrolyte is from ≥0.5 M to ≤1.5 M.

4. The electrolyte as claimed in claim 1, wherein the concentration of lithium 2-pentafluoroethoxy-1,1,2,2-tetrafluoroethanesulfonate in the electrolyte is from ≥0.7 M to ≤1.2 M.

5. The electrolyte as claimed in claim 1, wherein the solvent comprises an organic solvent.

6. The electrolyte as claimed in claim 1 wherein the solvent comprises an organic solvent and wherein the organic solvent comprises a mixture of ethylene carbonate and at least one further organic solvent.

7. The electrolyte as claimed in claim 5, wherein the organic solvent is selected from the group consisting of ethylene carbonate, propylene carbonate, diethyl carbonate, dimethyl carbonate, ethyl methyl carbonate, acetonitrile, glutaronitrile, adiponitrile, pimelonitrile, gamma-butyrolactone, gamma-valerolactone, dimethoxyethane, 1,3-dioxolane, methyl acetate and mixtures thereof.

8. The electrolyte as claimed in claim 7, wherein the organic solvent is selected from the group consisting of ethylene carbonate, diethyl carbonate, dimethyl carbonate, ethyl methyl carbonate and mixtures thereof.

9. The electrolyte as claimed in claim 6, wherein the further organic solvent is gamma-butyrolactone.

10. The electrolyte as claimed in claim 9, wherein ethylene carbonate and gamma-butyrolactone are in a ratio from ≥1:99 to ≤99:1.

11. The electrolyte as claimed in claim 9, wherein ethylene carbonate and gamma-butyrolactone are in a ratio from ≥1:9 to ≤9:1.

12. The electrolyte as claimed in claim 9, wherein ethylene carbonate and gamma-butyrolactone are in a ratio from ≥3:7 to ≤1:1.

* * * * *